United States Patent [19]

Shin

[11] Patent Number: 5,110,482

[45] Date of Patent: *May 5, 1992

[54] WATER REPURIFICATION METHOD OF CITY WATER AND ITS EQUIPMENT

[75] Inventor: Kyong S. Shin, Seoul, Rep. of Korea

[73] Assignee: Goldstar, Co., Ltd., Seoul, Rep. of Korea

[*] Notice: The portion of the term of this patent subsequent to Aug. 7, 2007 has been disclaimed.

[21] Appl. No.: 507,039

[22] Filed: Apr. 10, 1990

Related U.S. Application Data

[63] Continuation of Ser. No. 239,177, Aug. 31, 1988.

[30] Foreign Application Priority Data

Sep. 12, 1987 [KR] Rep. of Korea ............... 1987/10141

[51] Int. Cl.$^5$ ............................. B01D 24/16
[52] U.S. Cl. .............................. 210/758; 210/793; 210/804; 210/87; 210/95; 210/257.1; 210/265; 210/275; 210/293; 210/313
[58] Field of Search ............ 210/764, 793, 804, 807, 210/95, 257.1, 261, 262, 265, 275, 205, 293, 299, 311, 313, 758, 290

[56] References Cited

U.S. PATENT DOCUMENTS

| | | | |
|---|---|---|---|
| 224,680 | 2/1880 | Green | 210/262 |
| 231,480 | 8/1880 | Downes | 210/262 |
| 331,790 | 12/1885 | Hood | 210/267 |
| 420,428 | 2/1890 | Baker | 210/311 |
| 459,099 | 9/1891 | Porter | 210/95 |
| 524,827 | 8/1894 | Jones et al. | 210/265 |
| 537,705 | 4/1895 | McCabe | 210/275 |
| 826,654 | 7/1906 | Tirth | 210/257.1 |
| 869,294 | 10/1907 | Clark et al. | 210/95 |
| 989,965 | 4/1911 | Harloe | 210/94 |
| 1,329,462 | 2/1920 | Frey | 210/290 |
| 1,433,357 | 10/1922 | Ellis | 210/290 |
| 3,202,286 | 8/1965 | Smit | 210/293 |
| 3,841,485 | 10/1974 | Malkin | 210/104 |
| 4,028,241 | 6/1977 | Davis et al. | 210/265 |
| 4,086,165 | 4/1978 | Formenti | 210/104 |
| 4,692,246 | 9/1987 | Simon | 210/262 |
| 4,946,600 | 8/1990 | Shin | 210/758 |

FOREIGN PATENT DOCUMENTS 2022437 12/1979 United Kingdom .
2102299 2/1983 United Kingdom .

Primary Examiner—Stanley S. Silverman
Assistant Examiner—C. Upton
Attorney, Agent, or Firm—Spencer, Frank & Schneider

[57] ABSTRACT

A method of repurifying water from a public supply, comprising the steps of:
  taking water to be repurified continuously from the public supply;
  filtering the water slowly through a volume of particulate material; and
  accumulating the filtered water to provide a store of repurified water for later use as and when required.

According to a second aspect of the present invention, there is provided an apparatus for repurifying water from a public supply, comprising:
  a water inlet adapted for connection to the public supply and operable to take a continuous flow of water from the supply;
  a filter comprising a volume of particulate filter material and arranged to receive the water from the water inlet;
  a container arranged to receive filtered water therefrom and to store the filtered water;
  and a water outlet connected to the container and operable to draw off filtered water as and when required.

19 Claims, 7 Drawing Sheets

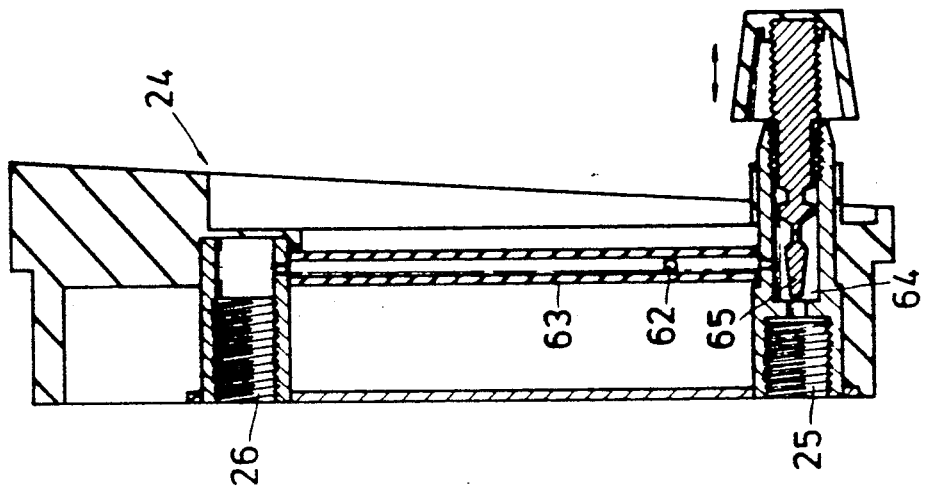
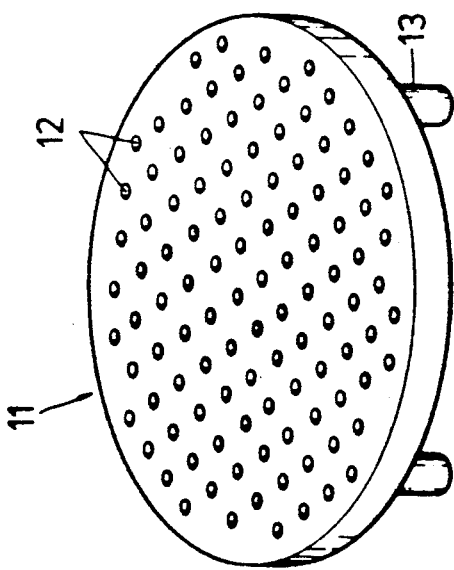

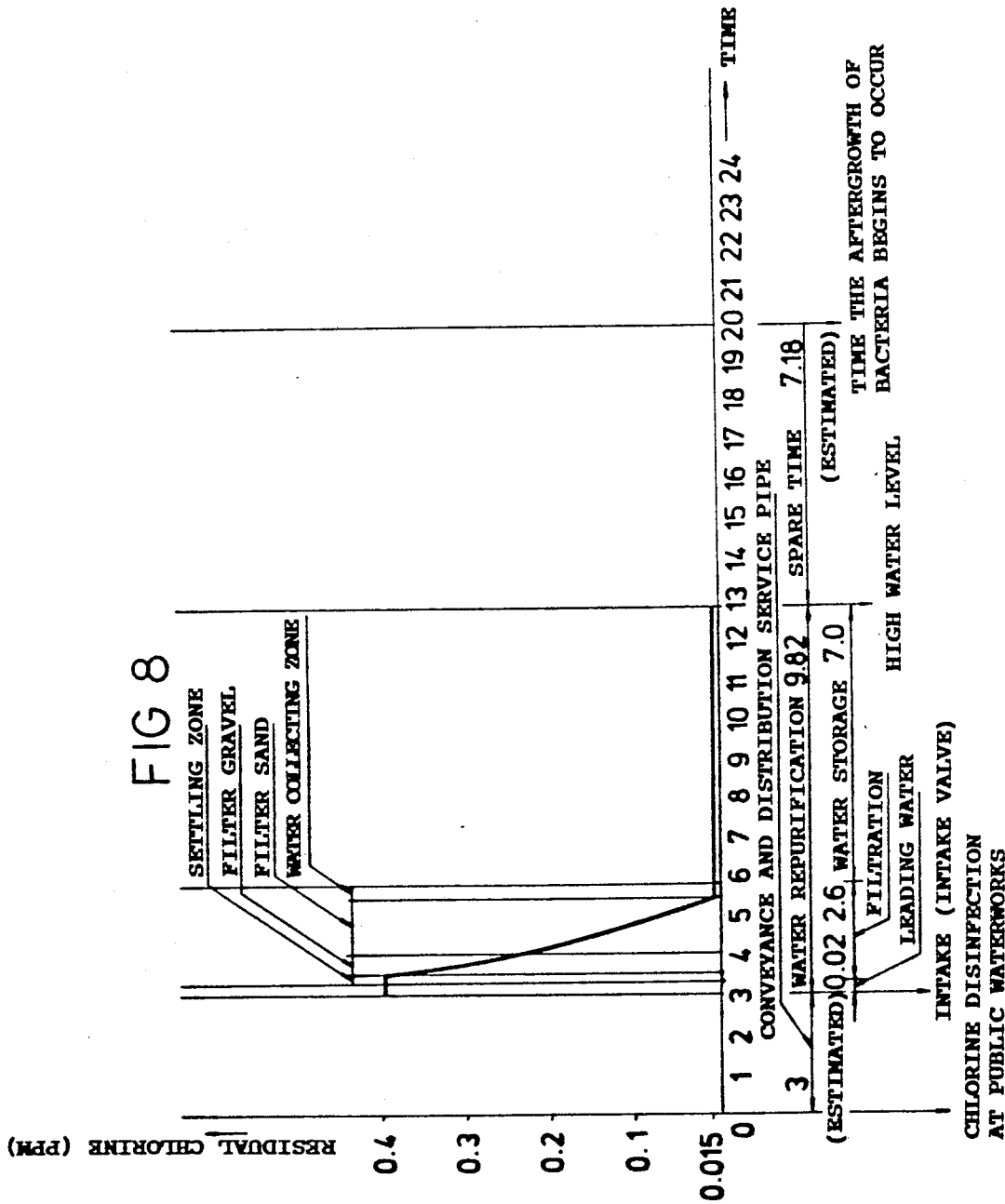

WATER REPURIFICATION METHOD OF CITY WATER AND ITS EQUIPMENT

This is a continuation of application Ser. No. 07/239,177 filed Aug. 31, 1988.

BACKGROUND OF THE INVENTION

1. Field of the Invention

The present invention relates to a repurification method and apparatus for water from a public supply, particularly, but not exclusively for repurifying water (e.g. city water) from a public waterworks which has already been purified once for drinking.

2. Technology Review

In general, water purifying treatments performed in public waterworks, despite differences of treating methods and the scale of purifying equipment used, usually include a final disinfection process with chlorine. According to one water quality standard, for example, water from a tap should contain at least 0.2 ppm. of free residual chlorine or at least 1.5 ppm. of combined residual chlorine.

Though these residual chlorines maintain safety sanitarily, they can cause an unpleasant odor when drunk so it is preferable to remove them before water is used as drinking water. Further, the removal of organic materials is also required, because they provide conditions for the growth of bacteria. Thus, many kinds of water repurification equipment for removing residual chlorines and, in some cases organic materials have been developed and used.

Known types of water repurification equipment vary somewhat in operation, but normally involve the use of activated carbon having a strong ability to remove, by adsorption, the residual chlorine and organic materials by passing the water rapidly through activated carbon layers. These are satisfactory when first used, but there are many problems as listed below.

First, there is a problem with the increase in bacteria levels. The increase of bacteria has become the most important problem in the known water repurification methods.

Typically, water from the main supply has few live bacteria, but once the water has been treated by a known water repurification method, the level of bacteria is found to be 10 times to 1,000 times the permitted limit set by typical water-quality-standards.

The reason why so many bacteria are detected in the filtered water is because of the time at which known filtration processes are carried out.

A typical water repurifier filters by the following method; the inflow valve (or the service connection tap, if the repurifier is directly connected to the main supply) is opened and water passes rapidly through the layers of the activated carbon in the water purifier. After filtered water is collected in a container, the inflow valve is closed. If necessary, water can then be filtered again at any time.

In this type of filtration method, when the inflow valve is closed, water is left in the layers of the activated carbon, and loses its disinfection ability because all its residual chlorine is adsorbed by the activated carbon. In addition, on the surface of the activated carbon the dissolved oxygen volume will be increased, because air comes in through the outlet. Filtered-out organic materials are also present in the layer of activated carbon.

Consequently, in such a water repurifier, the basic conditions in which bacteria can live and multiply, namely moisture, organic material and oxygen, are present. Therefore, bacteria multiply quickly in the water repurifier and when the inflow valve is opened again to filter more water, these bacteria mix with the filtered water and flow out.

As a result, the water drunk by a consumer has a concentration of bacteria 10 times to 1,000 times greater than in the original supply.

To solve these problems, a method has been developed in which the activated carbon is coated with silver which has a disinfection ability and controls the increase of bacteria in the water trapped in the activated carbon layers. However, this method merely reduces the increase of bacteria somewhat, and the problem of exceeding the permitted limit is largely the same as in the traditional methods. Moreover, in view of the fact that silver has an injurious effect on the human body, it is questionable whether the use of silver in this way is desirable.

A second problem with typical activated carbon filters is that there is no durability of the water repurification effect. The activated carbon has a strong adsorption ability in the beginning, but as the filtered volume of water e.g. city water increases, the adsorption ability reduces very rapidly and the filtration effect decreases greatly. The reason is that the fine material and the organic material in the water become adhered and retained on the surface of the activated carbon, so that the area of the activated carbon surface which can directly act on the water is reduced and its adsorption ability is weakened.

Thus, the ability of the filter to remove residual chlorine and the organic material is comparatively good to start with, but after about one month of use, this ability is very quickly reduced, and it becomes impossible to remove turbid materials.

A third problem with carbon filters is that, the water is not filtered equally. The water is filtered to varying degrees of effectiveness, because of when the filtration method is performed and because the filtration rate may become very rapid.

A fourth problem is that washing and disinfection of the filter material is impossible. In the traditional filtration methods, washing and disinfection of the filter material has not been considered at all.

Accordingly, there has been the above problem that consumers drink filtered water contaminated with bacteria.

A fifth problem is that the change period of the filter material or of all parts of the water repurification equipment is very short.

As mentioned above, because the traditional water repurifier has no durability of filtration effect, bacteria increase, washing and disinfection is impossible, and the use period of the filter material or of the whole water repurifier is very short, so that it must be changed often.

SUMMARY OF THE INVENTION

It is therefore an object of the present invention to address the above problems with prior water repurification equipment.

According to one aspect of the present invention there is provided a method of repurifying water from a public supply, comprising the steps of:

taking water to be repurified continuously from the public supply;

filtering the water slowly through a volume of particulate material; and accumulating the filtered water to provide a store of repurified water for later use as and when required.

According to a second aspect of the present invention, there is provided an apparatus for repurifying water from a public supply, comprising:

a water inlet adapted for connection to the public supply and operable to take a continuous flow of water from the supply;

a filter comprising a volume of particulate filter material and arranged to receive the water from the water inlet;

a container arranged to receive filtered water therefrom and to store the filtered water;

and a water outlet connected to the container and operable to draw off filtered water as and when required.

Embodiments of the invention may provide filtered clear water with complete prevention of bacterial growth at all times. This allows the water purification effect to be maintained continuously and enables purification to a consistent level al the time. Embodiments of the invention may also allow washing of the filter material, which keeps the water clean and enables the use of the filter material semi-permanently.

Some basic differences between embodiments of this invention and the traditional methods can be summarized as follows:

A continuous and steady filtration is provided, unlike the traditional filtration methods which are carried out intermittently.

The filtration is slow, as compared with the traditional superrapid filtration which takes place within seconds to a few minutes.

The filtering materials used are gravel and sand which have strong durability as compared with the traditional activated carbon which has strong adsorption ability.

The filtration principle used is oxidation and retention as compared to the traditional instant adsorption and retention.

The apparatus which carries out the method of the invention is principally composed of intake, leading, filtration, water storage and accessory equipment, as compared to the traditional intake, leading and filtration equipment.

The filtering material can be washed when required, unlike the traditional method in which the filter material cannot be washed at all.

Disinfection can be carried out as needed, unlike the traditional method in which no disinfection is possible.

The filtering effect is continuously good, as compared with the traditional effect which is good to begin with, but reduces rapidly during use.

The filtering material can be used semi-permanently, unlike with the traditional method in which it must be changed often.

In water filtered by the present invention, bacteria levels are low even after prolonged use, residual chlorine and turbid material are removed almost completely, and the amount of organic material is greatly reduced. In particular, few or no bacteria of the coli group are present in the filtered water.

Equipment embodying this invention can take in, lead, inflow, filter and store water before bacteria start to multiply.

BRIEF DESCRIPTION OF THE DRAWINGS

FIG. 6 is a perspective view of a filter base of the equipment;

FIG. 7 is a sectional side view of a float-type flow meter; and

FIG. 8 is a graph showing the amount of residual chlorine as a function of time in the case of filtering city water at a rate of 24 liters per day.

DESCRIPTION OF THE PREFERRED EMBODIMENTS

Figure 3:
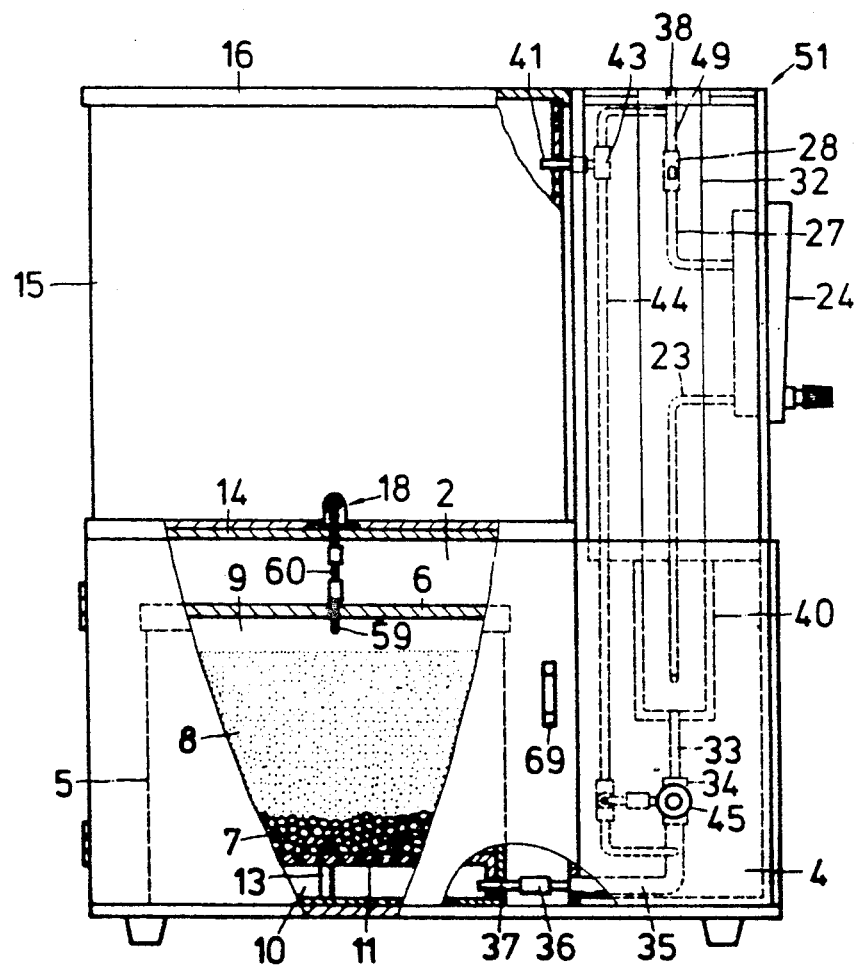
FIG. 3 is an elevational view partly in section of the equipment.

As shown in FIG. 3, one side of a box or outer casing 1 has an installing space 2 for a filter basin 5. The front part is opened and closed by a door 3 having a handle 69 (see FIG. 1) on the outside. Casing 1 has an inserting space 4 for the distributing pipe box 51 which has an exposed front and top. Filter gravel 7 and filter sand 8 are placed in the installing space 2 leaving a space above forming a water collecting zone 9 and a space underneath forming a settling zone 10. The filter basin 5 is closed by a cover 6. A water storage basin 15 is fitted with a cover 16 with holes 17 for ventilation. The base 14 of the water storage basin 15 is located at the upper part of the installing space of the filter basin 2. The water collecting zone 9 is connected to the filter basin 5 and the lower part of the water storage basin 15 by an inflow pipe 20 for filtered water (see FIG. 5) and an inflow-outflow pipe 19 which are both connected to an outflow valve 18.

Filter gravel 7 and filter sand 8 in the filter basin 5 are heaped onto a filter base 11, the latter having a number of through-holes 12 for allowing water to pass through as shown in FIG. 6. Support legs 13 are fixed underneath the filter base 11, and define a space which constitutes the settling zone 10.

Figure 5:
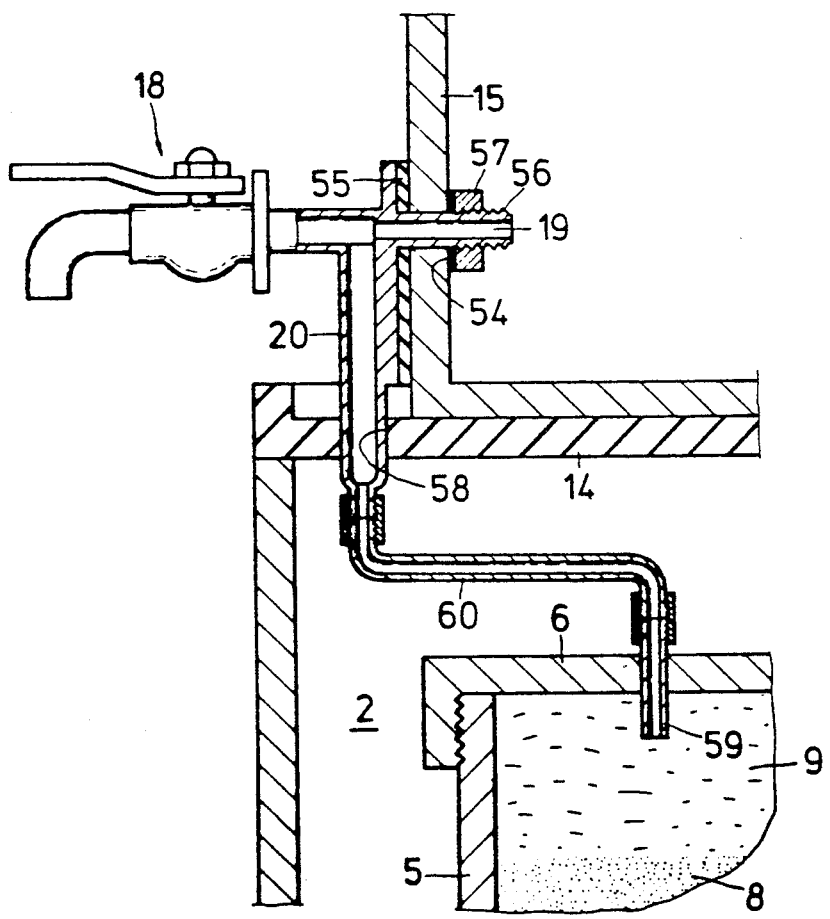
FIG. 5 is an expanded sectional view of the connections of a filter basin, a water storage basin and an outflow valve.

The outflow valve 18 is installed by connecting the inflow-outflow pipe 19 through the lower side of the front of the water storage basin 15, inserting packing 54 and 55 as shown in FIG. 5, and tightening a fixing screw 57 to a screw part 56 of the inflow-outflow pipe 19. The inflow pipe 20 of the filtered water is connected through into the installing space 2 of the filter basin, through an inserting hole 58 in the installing base 14 of the water storage basin, and connected with the outflow pipe 59 of the filter basin which is passed through the cover 6 of the filter basin by the inflow connecting pipe 60 of the water storage basin.

In the settling zone 10 of the filter basin 5, water to be filtered flows in uniformly and continuously through an intake or lead distributing pipe 21 and an inflow distributing pipe 31 from the intake-valve 50, which is fitted to the service pipe 61 of the main supply and allows control of the water flow. The water is filtered by flowing it slowly through the filter gravel 7 and filter sand 8.

Figure 2:
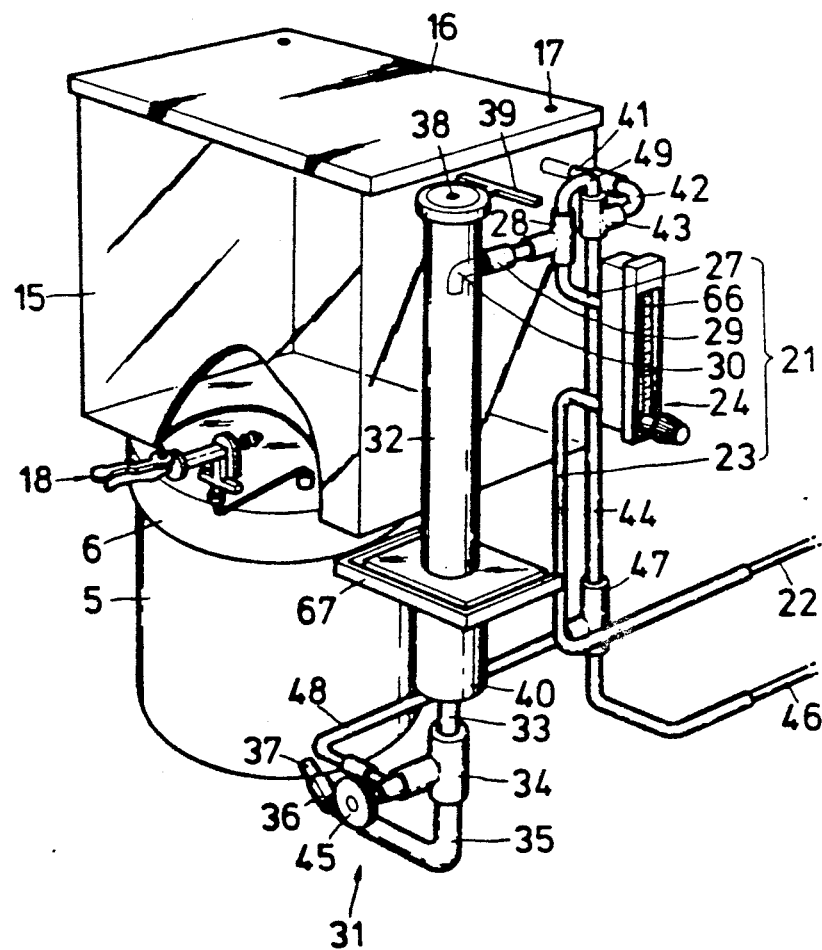
FIG. 2 is a perspective illustration of the equipment without its outer casing.

Referring to FIG. 2, the intake (distributing) pipe 21 is installed by connecting the upper part of a first intake (distributing) pipe 23, with the inlet 25 (see FIG. 7) of a float-type flowmeter 24, and by connecting the upper part of a second intake pipe 27 with a dropping pipe 30. The first intake pipe 23 is connected with the intake valve 50 by the intake tube 22 and the second intake pipe 27 is connected with the outlet 26 of the float-type flowmeter 24. The front part of the dropping pipe 30 is bent downward through an intake connecting T tube 28 and the intake connecting pipe 29. The inflow distributing pipe 31 is connected by connecting the bent inflow pipe 35 with the inflow pipe 37 of the filter basin. The inflow pipe 37 passes through the lower side of the filter basin 5 and is connected by the inflow connecting pipe 36 to the inflow pipe 35. The bent inflow pipe 35 is connected by the inflow connecting T tube 34 to the inflow leading pipe 33 leading to the lower part of a transparent tube 32 indicating inflow and water level. The upper part of the tube 32 encloses the bent end of the pipe 30.

By providing one or more holes 38 in the top end of the transparent tube 32, water which flows in from the dropping pipe 30 can form a free water surface which indicates inflow and water level.

Figure 1:
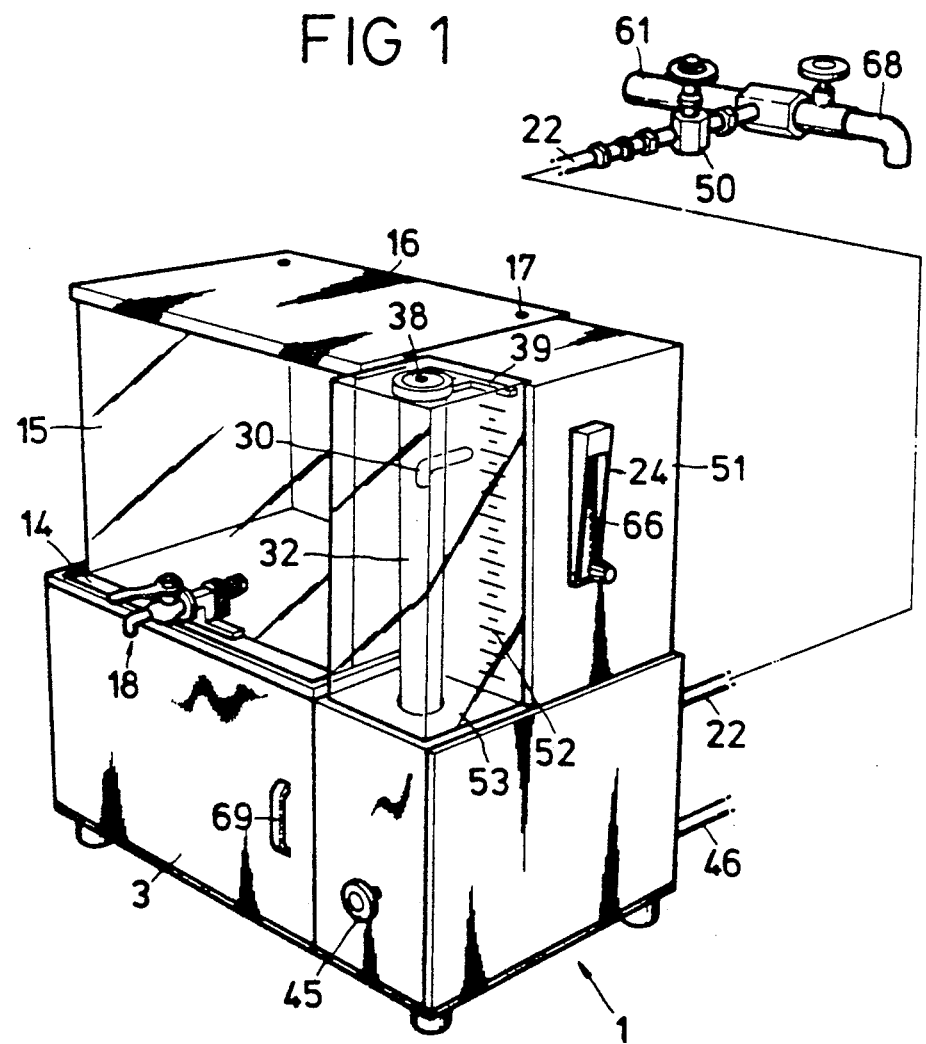
FIG. 1 is an overall perspective view of water repurification equipment embodying the present invention.

Referring to FIG. 1, the distributing pipework except for the transparent tube 32 and the float-type flowmeter 24 is installed within the distributing pipe box 51 which is inserted in an inserting space 4 (FIG. 3) provided therefor in the outer casing. The float-type flowmeter 24 is fixed on the side of the distributing pipe box 51, and the transparent tube 32 is located at the front of the distributing pipe box 51.

Inserted through the upper side of the water storage basin 15, an overflow pipe 41 connects with the upper part of a main drain pipe 44 via an overflow connecting pipe 42 and an overflow connecting T pipe 43 (see FIG. 2). The inlet of a back wash valve 45 is connected to an inflow connecting T pipe 34. The drain connecting T pipe 47, which connects a drain hose 46 to the lower end of the main drain pipe 44, is connected to the outlet of the back wash valve 45 by a drain pipe 48 for back washing. The lead connecting T pipe 28 and the overflow connecting T pipe 43 are connected by a lead overflow connecting pipe 49.

On the front of the distributing pipe box 51, a scale 52 is provided for indicating the water level in the transparent tube 32. The transparent tube 32 is protected by a transparent cover 53.

As shown in FIG. 7, the float-type-flowmeter 24 which has an inlet 25 and outlet 26 which are connected with a tube 63 indicating flow volume by means of a floating ball 62. The size of opening (flow way) 64 between the inlet 25 and the tube 63 is controlled with a flow-volume-setting cone 65.

Figure 4:
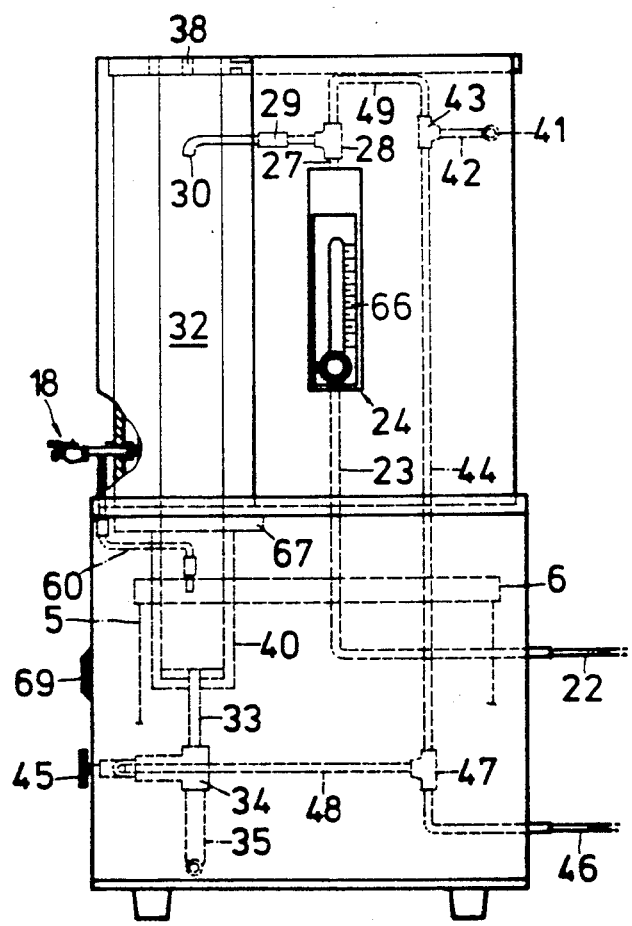
FIG. 4 is a side elevational view of the equipment.

Referring to the numbered parts not yet mentioned, numeral 39 is a fixing rack for fixing the upper part of the transparent-tube 32 to the distributing pipe box 51, 40 (FIG. 4) designates a supporting body for supporting the lower part of the transparent-tube 32, numeral 66 is the scale of the float-type-flowmeter 24, numeral 67 is a support board for supporting the transparent cover 53, numeral 68 (FIG. 1) is a service connection tapmains supply tap connected with the service pipe 61, and numeral 69 is a handle of the door 3.

The operation of the above-described embodiment of the invention will now be described.

Upon opening the intake-valve 50 provided on the service pipe 61, water flows generally uniformly under the pressure of water in the service pipe 61 through the leading tube 22, through the first leading pipe 23 and into the inlet 25 of the float-type flowmeter 24.

As a result of water flowing through the opening 64 via the inlet 25 of the float-type flowmeter 24, the ball 62 in the tube indicating flow-volume 63 floats so as to indicate the flow-volume on the scale 66.

The floating ball 62 is made to lie at the required level on the scale 66 by controlling the intake-valve 50, so as to set the desired intake volume. This intake volume is maintained until the intake valve 50 is adjusted.

As the intake is decreased, the flow rate becomes accordingly slower as the water reaches the high water level of the water storage basin 15, filtration also becomes slower.

Water flows into the dropping-pipe 30 from the outlet 26 of the flowmeter 24 through the pipes 27, 28 and 29, leaves the lead distributing pipe 21, and falls vertically into the transparent tube 32. The falling drops of water splash onto the water surface in the transparent tube 32 making it easy to observe the inflow situation.

Then, the water flows from the transparent tube 32 into the settling zone 10 formed at the bottom of the filter basin 5, through the pipes 33, 34, 35 36, and 37. Because air from outside enters the transparent tube 32 from the ventilation hole 38, a free water surface under atmospheric pressure is formed in the tube, and an upflow of water results in the filter basin 5.

The water which flows into the settling zone 10 penetrates the holes 12 in the filter base 11 and filters up through the layers of filter gravel 7 and filter sand 8. The filtered water is collected in the water collecting zone 9 which is formed between the upper part of filter sand 8 and the cover 6 of the filter basin.

The concentration of residual chlorine of water in the settling zone 10 remains almost the same as the concentration of the residual chlorine in the service pipe 61. On the other hand, the residual chlorine in the water which gradually permeates through the filter gravel 7 and filter sand 8 over a long period of time, is slowly oxidised and consumed by the organic material, Fe, Mn, ammonia nitrogen and organo nitrogen, oxidised materials present in the supply water. Therefore, the chlorine concentration gradually decreases. As water flows upwards from the settling zone 10 to the collecting zone 9 and the water in collecting zone 9 is kept continuously at a low chlorine concentration.

The residual chlorine is thus removed in this way, and moreover, organic material, Fe, Mn, Ammonia nitrogen and organo nitrogen are reduced, because they are the materials which oxidize the residual chlorine.

Turbid solid materials in the water are partly precipitated in the settling zone 10 and they are removed almost completely by adhesion and retention in the filter sand 8, as the water seeps slowly through voids between the sand grains.

The removal rate of the residual chlorine, etc. depends upon the volume of the filter basin 5 and the filtration rate. That is, the greater the volume of the filter basin 5 and the slower the filtration rate, the higher the removal rate becomes. Thus, by suitably controlling the volume of the filter basin 5 and the filtration rate, the residual chlorine can be removed to the desired extent, so that, for example, a very small amount of the residual chlorine can be maintained in the filtered water of the water collecting zone 9.

The filtered water from the filter basin 5 flows into the water storage basin 15 continuously through the outflow pipe 59 of the filter basin, the inflow connecting pipe 60 of the water storage basin, the inflow pipe 20 for the filtered water and the inflow-outflow pipe 19 of the outflow valve 18.

The water level in the transparent tube 32 and in the water storage basin 15 increase, forming a difference in water level corresponding to the head loss when passing though filter gravel 7 and filter sand 8. The stored filtered water is drawn off for use by operating the outflow valve 18.

Filtered fresh water having a very small amount of residual chlorine continuously flows into the water storage basin 15. However, the filtered water in the water storage basin 15 can be kept fresh despite the small amount of chlorine, because the material which can be easily oxidised by the residual chlorine has been already oxidised in the filter basin 5. Even when the filtered water is not used, in spite of reaching a high water level, the filtered water can be kept fresh because excess water overflows through the overflow pipe 41 of the water storage basin and draining into the main drain pipe 44 through the overflow connecting pipe 42 and the overflow connecting-T-tube 43.

It is believed in the water supply industry that regrowth of bacteria begins some 20 hours after water has been disinfected by chlorine in a public waterworks. Accordingly, it is desirable to repurify the water before this 20 hours deadline, i.e. in the time remaining after water has reached the intake valve 50 from the waterworks or a clean water reservoir and with some time allowed as a safety margin.

Thus, the intake volume is preferably set such that the time for water to reach the high water level of the water storage basin 15 after entering the apparatus by the intake valve 50 is less than the time it takes for bacterial growth to start. This intake volume can be controlled by the intake valve 50 and the flowmeter 24 as mentioned above. Generally, public water supply networks are organized on the principle that water can reach all service connection taps 68 from the waterworks or reservoir within a few hours. As shown in FIG. 8, the apparatus embodying the present invention ca perform its filtration before the time when aftergrowth of bacteria begins to occur, because intake, distribution, filtration and storage are possible within 10 hours regardless of the filtration volume.

Therefore, no regrowth of bacteria occurs in filter basin 5 and storage water basin 15, because during time period before regrowth of bacteria can occur, the water continuously retains residual chlorine in a gradually decreasing concentration, and because the structure of the equipment does not allow free oxygen in the air to enter into the filter basin 5.

This feature makes the invention different from traditional methods. As an experimental test, city supply water repurified by the method of the present invention was taken when the water storage basin 15 was full, kept at the atmospheric temperature for 24 hours, and then subjected to microbiological tests. The results of the tests are shown in Table 5. These show that, in general, multiplication of bacteria does not occur, and, in particular, bacteria of the coli group are not present.

It is inferred that the reason for this is that a very small amount of organic material and bacteria in a nonvital syncoptic state are removed in the filter basin 5.

Thus, it is shown that even when water filtered by the method of this invention is left to stand for more than 20 hours, the regrowth of bacteria is minimal, so water can be treated in any location in a supply area with time to spare before regrowth of bacteria begins to occur.

After the water supply from the public waterworks has been interrupted, for example, because the intake valve 50 has been closed for moving or for other reasons, it is desirable to disinfect the apparatus for safety against bacteria. This can be done by adding a disinfectant solution e.g. of bleaching powder of a concentration such that the residual chlorine in the water storage basin 15 can be over 1 ppm, by standing a funnel in the hole 38 in the upper part of the transparent tube 32.

The solution mixes with the water falling from pipe 30 in the transparent tube 32, and disinfects the inside of pipes 33 to 37, settling zone 10, filter base 11, filter gravel 7, filter sand 8, filter basin 5, water collecting zone 9, outflow pipe 59, the inflow connecting pipe 60, the inflow pipe 20, inflow-outflow pipe 19 and the water storage basin 15. When the water reaches the high water level, it is discarded by opening the outflow valve 18 and the filtered water which is stored may be used.

As stated above, in this invention, prevention against bacteria is provided in all situations. But, if filtration is continued for a long period, the minute turbid material of city water is precipitated in the settling zone 10, and it is retained on the filter gravel 7 and filter sand 8.

As turbid material gradually accumulates, the head loss will increase. This can be detected by the difference between the water level of the transparent tube 32 and the water level of the water storage basin 15, and is easily observed with the naked eye when the transparent tube 32 and the water storage basin 15 are all made with transparent materials.

If the difference of water levels becomes sufficiently large, the water level of the transparent tube 32 rises up, before the filtered water of the water storage basin 15 reaches the high water level. Because some of the water overflows through the overflow connecting pipe 49 and is drained through the main drain pipe 44, there is no danger of overflow through the hole 38 of ventilation and disinfection; nevertheless, the turbid materials retained in the filter basin 5 need to be discharged.

If the back wash valve 45 (FIG. 2) is opened when the water storage basin 15 reaches the high water level, the filtered water in the water storage basin 15 discharges into the draining hole through the inflow-outflow pipe 19 and the inflow pipe 20, the inflow connecting pipe 60 of the water storage basin, the outflow pipe 59 of the filter basin, the water collecting zone 9, filter sand 8, filter gravel 7, the holes 12 in the filter base 11, the settling zone 10, the inflow pipe 37 of the filter basin, the bent inflow pipe 35, the inflow connecting-T-pipe 47 and the drain hose 46 so that unusable back washing water is drained.

At this time, the turbid material retained on filter gravel 7 and filter sand 8 and the precipitated material in the settling zone 10 are discharged by the rapid backwards flow rate.

If the water level of the water storage basin 15 reaches the low water level position of the inflow-outflow pipe 19 of the outflow-valve 18, external air must be prevented from flowing into the filter basin 5 directly by locking the back wash valve 45 in order to complete back washing. This prevents multiplication of bacteria in the filter basin 5 due to the presence of air. If the filtered water is not used until the water level of the water storage basin 15 reaches a high water level, the filtered water in the water storage basin 15 is drained by the drain hose 46 through the overflow pipework 41 to 43, to the main drain pipe 44 and the drain connecting-T-pipe 47.

If the overflow of water results from opening the intake valve 50 first (FIG. 1), some of the excess water volume is drained into the outlet through the overflow connecting pipe 49, the main drain pipe 44 and the drain hose 46.

As mentioned above, the tube 32 for indicating the inflow and water level of the inflow distributing pipe 31 is transparent, and water falling from pipe 30, splashes on the water surface in the tube 32. Therefore, the inflow condition can be checked with the naked eye, and, by watching the float-type-flowmeter 24, one can control the intake valve 50, if it is desired to change the volume of filtered water being produced.

In addition, if the water storage basin 15 is opaque, one can monitor the stored volume of water in the water storage basin 15 by the water level of the transparent tube 32 and the water level against the scale 52 at the front of the distributing pipe box 51. Also, if the water storage basin 15 is formed transparently as well, the washing time of the filter basin 5 (i.e. whether backwashing is required) can be judged from the difference of water levels between the two.

In this embodiment, the gravel 7 and sand 8 are used as filter materials because they have good durability ability. The action of filtration is not carried out by the action of the gravel or sand itself, but by oxidation in the voids in the gravel 7 and sand 8 the residual chlorine by the oxidised materials in the water. Moreover, retained turbid material can be discharged by washing as stated above, so the filtration effect is maintained without any deterioration. As gravel and sand have good durability and are semi-permanent, there is little or no need to change the filtering material. Also, this embodiment has the advantage that the connection between the filter basin 5 and the water storage basin 15, is implemented using one outflow valve 18 in two ways. This is convenient because inflow and outflow can be effected by a single hole in the water storage basin 15.

An apparatus embodying the present invention was subjected to experimental tests, and the results of the tests are as stated below. The experiments were carried under the following standards and conditions.

(A) Standards. These parameters have a direct effect on the operation of the apparatus.

(1) filter basin
diameter 0.19M
height 0.17M
height of settling zone 0.02M
height of filter gravel 0.03M
height of filter sand 0.1M
height of the water collecting zone 0.02M
size of filter gravel 3–8 mm, void rate 40%
filter sand, as standard filter sand of slow speed, void rate 45%
(2) water storage basin
width 0.23M
length 0.17M
height up to the high water level 0.18M
(3) filter area of the filter basin (a)=0.028M$^2$
(4) capacity
capacity of leading water and inflow pipe (b)=0.00022M$^3$
void capacity of filter basin (c)=0.0026M$^3$
capacity up to the high water level of the water storage basin (d)=0.007M$^3$
total capacity (b+c+d)=0.00982M$^3$ (e)

(B) Tab. (1) is related with filtration rate and detention period.

Tab. (1) filtration rate and detention period

| | filtration volume | |
|---|---|---|
| Division | 24 l/day = 0.024 M$^3$/day(f) = 0.001 M$^3$/hour(g) | 48 l/day = 0.048 M$^3$/day (h) = 0.002 M$^3$/hour(i) |
| filtration rate (M/day) | $\frac{f}{a} = 0.85$ | $\frac{h}{a} = 1.7$ |
| Detention period (hour) | | |
| leading water | $\frac{b}{g} = 0.22$ | $\frac{b}{i} = 0.11$ |
| filtration | $\frac{c}{g} = 2.6$ | $\frac{c}{i} = 1.3$ |
| storage water | $\frac{d}{g} = 7$ | $\frac{d}{i} = 3.5$ |
| total detention period | $\frac{e}{g} = 9.82$ | $\frac{e}{i} = 4.91$ |
| reference | filtration rate (M/day) = filtration volume (M$^3$/day)/filtration area (M$^2$) detention period (hour) = capacity (M$^3$)/inflow volume per hour (M$^3$/hour) | |

(C) Result of analysis of water quality is as Tab. 2, 3, 4, and 5.

TABLE 2 analysis of water quality

| | | 24 l/day filtration | | | | |
|---|---|---|---|---|---|---|
| | | city water | | filtered water | | |
| Division | test item | test frequency | test value | test frequency | test value | remove rate |
| common filtration | residual chlorine | 85 | ppm 0.2–0.8 | 85 | ppm 0.01–0.05 | 93–95% |
| | | 59 | 0 | 41 | 0 | |
| | general bacteria | 5 | 2–7 | 22 | 2–9 | |
| | | 4 | 13–26 | 5 | 12–23 | |
| | bacteria coli group | 18 | 0 | 18 | 0 | |
| when start refiltration after back washing of filter basin | residual chlorine | 5 | ppm 0.2–0.5 | 5 | ppm 0.01–0.04 | 92–95% |
| | | 4 | 0 | 1 | 0 | |
| | general bacteria | 1 | 2 | 3 | 8–16 | |
| | | | | 1 | 20 | |
| | bacteria coli group | 5 | 0 | 5 | 0 | |
| when start re- filtration after closing intake valve for 72 hours | after 7 hours of refiltration | residual chlorine | 2 | ppm 0.3–0.6 | 2 | ppm 1.5–2.0 |
| | | general bacteria | 2 | 0 | 2 | 0 |
| | | bacteria coli group | 1 | 0 | 1 | 0 |
| | after 48 hours of refiltration | residual chlorine | 3 | ppm 0.3–0.5 | 3 | ppm 0.02–0.04 | 92–93% |
| | | | 2 | 0 | 2 | 0 |

TABLE 2-continued

| | analysis of water quality | | | | |
|---|---|---|---|---|---|
| and next | general bacteria | 1 | 3 | 1 | 7 |
| disinfection | bacteria coli group | 2 | 0 | 1 | 0 |

| | | 48 l/day filtration | | | | |
|---|---|---|---|---|---|---|
| | | city water | | filtered water | | |
| Division | test item | test frequency | test value | test frequency | test value | remove rate |
| common filtration | residual chlorine | 55 | ppm 0.2-0.8 | 55 | ppm 0.02-0.05 | 90-93% |
| | | 42 | 0 | 47 | 0 | |
| | general bacteria | 5 | 3-7 | 1 | 3 | |
| | | 2 | 12 | 1 | 6 | |
| | bacteria coli group | 9 | 0 | 9 | 0 | |
| when start refiltration after back washing of filter basin | residual chlorine | 3 | ppm 0.3-0.8 | 3 | ppm 0.02-0.05 | 93% |
| | | 3 | 0 | 1 | 0 | |
| | general bacteria | | | 1 | 3 | |
| | | | | 1 | 5 | |
| | bacteria coli group | 3 | 0 | 3 | 0 | |
| when start re- filtration after closing intake valve for 72 hours | after 7 hours of refiltration | residual chlorine | 2 | ppm 0.3-0.5 | 2 | ppm 2.0-2.5 | |
| | | general bacteria | 2 | 0 | 2 | 0 | |
| | | bacteria coli group | 1 | 0 | 1 | 0 | |
| | after 48 hours of refiltration | residual chlorine | 3 | ppm 0.3-0.5 | 3 | ppm 0.02-0.05 | 90-93% |
| | | | 2 | 0 | | | |
| and next disinfection | general bacteria | 1 | 3 | 3 | 0 | |
| | bacteria coli group | 2 | 0 | 1 | 0 | | reference
1. These are the test values which applicant tested directly with auto-testing tools and machines and chemicals.
2. Water sample was always carried when the water storage basin was full.
3. Test method was by appendix 2 the order of Ministry of Health Social affairs, No. 102.
4. Test period was March 5, 1987 - September 2, 1987.

TABLE 3 analysis of water quality (chemical test and removal rate)

| | | 24 l/day filtration | | | | | | | | |
|---|---|---|---|---|---|---|---|---|---|---|
| | | first | | | second | | | third | | |
| Test | Unit | city water | filtered water | removal rate | city water | filtered water | removal rate | city water | filtered water | removal rate |
| PH | | 7.2 | 7.2 | — | 7.3 | 7.3 | — | 7.3 | 7.3 | — |
| color | degree | 0 | 0 | — | 0 | 0 | — | 0 | 0 | — |
| turbidity | degree | 1.0 | 0 | 100% ↓ | 1.0 | 0 | 100% ↓ | 1.0 | 0 | 100% |
| residual chlorine | ppm | 0.54 | 0.03 | 96% ↓ | 0.83 | 0.05 | 94% ↓ | 0.48 | 0.03 | 94% |
| remains on evaporation | ppm | 71.0 | 60.0 | 15% ↓ | 72.0 | 67.0 | 7% ↓ | 77.0 | 72.0 | 6% |
| chlorine ion | ppm | 12.8 | 12.8 | 0% | 11.3 | 11.3 | 0% | 12.8 | 12.8 | 0% |
| ammonia nitrogen | ppm | 0 | 0 | — | 0 | 0 | — | 0 | 0 | — |
| nitrate nitrogen | ppm | 3.2 | 3.0 | 6% ↓ | 3.1 | 2.9 | 6% ↓ | 3.0 | 2.9 | 3% |
| organo phosporous | ppm | no detection | no detection | — | no detection | no detection | — | no detection | no detection | — |
| total hardness | ppm | 54.0 | 49.8 | 10% ↓ | 51.2 | 52.0 | 1% ↑ | 52.0 | 53.2 | 2% |
| C.O.D. | ppm | 3.9 | 3.7 | 5% ↓ | 3.8 | 3.4 | 10% ↓ | 3.7 | 3.5 | 6% |
| B.O.D. | ppm | 3.6 | 3.2 | 11% ↓ | 3.7 | 3.4 | 8% ↓ | 3.8 | 3.3 | 13% |
| D.O. | ppm | 7.3 | 6.7 | 8% | 6.5 | 5.5 | 15% ↓ | 6.9 | 6.7 | 3% |
| phenol | ppm | 0 | 0 | — | 0 | 0 | — | 0 | 0 | — |
| Fe | ppm | 0.1 | 0.09 | 10% ↓ | 0.08 | 0.08 | 0% | 0.09 | 0.09 | 0% |
| Ca | ppm | 12.9 | 11.7 | 9% ↓ | 12.3 | 12.7 | 3% ↑ | 12.5 | 12.8 | 2% |
| Mn | ppm | 0 | 0 | — | 0 | 0 | — | 0 | 0 | — |
| PCB | ppm | no detection | no detection | — | no detection | no detection | — | — | — | — |
| ABS | ppm | no detection | no detection | — | no detection | no detection | — | no detection | no detection | — |
| Cr | ppm | 0 | 0 | — | 0 | 0 | — | — | — | — |
| As | ppm | 0 | 0 | — | 0 | 0 | — | — | — | — |
| Zn | ppm | 0.1 | 0 | 100% ↓ | 0.1 | 0 | 100% ↓ | — | — | — |
| CN | ppm | no detection | no detection | — | no detection | no detection | — | — | — | — |
| Mg | ppm | 5.3 | 4.8 | 9% | 5.0 | 5.2 | 4% ↑ | 5.1 | 5.2 | 2% |
| SiO$_2$ | ppm | 6.8 | 6.6 | 3% | 6.9 | 6.9 | 0% | 6.8 | 6.5 | 4% |

| | | 48 l/day filtration | | | | | | |
|---|---|---|---|---|---|---|---|---|
| | | first | | | second | | | |
| Test | Unit | city water | filtered water | removal rate | city water | filtered water | removal rate | reference |
| PH | | 7.3 | 7.3 | — | 7.3 | 7.2 | — | 1. These were test values tested by industrial pollution laboratory. |
| color | degree | 0 | 0 | — | 0 | 0 | — | |
| turbidity | degree | 1.0 | 0 | 100% ↓ | 1.0 | 0 | 100% ↓ | |
| residual chlorine | ppm | 0.32 | 0.04 | 88% ↓ | 0.8 | 0.07 | 91% ↓ | |
| remains on | ppm | 87.0 | 84.0 | 3% ↓ | -86.0 | 83.0 | 3% ↓ | 2. Water sample |

TABLE 3-continued

| analysis of water quality (chemical test and removal rate) | | | | | | | | |
|---|---|---|---|---|---|---|---|---|
| evaporation | | | | | | | | was always carried |
| chlorine ion | ppm | 12.8 | 11.2 | 13% ↓ | 12.5 | 11.3 | 12% ↓ | when the water |
| ammonia nitrogen | ppm | 0 | 0 | — | 0 | 0 | — | storage basin was full. |
| nitrate nitrogen | ppm | 3.3 | 3.1 | 6% ↓ | 3.2 | 3.0 | 6% ↓ | 3. Test method was by |
| organo phosporous | ppm | no detection | no detection | — | no detection | no detection | — | appendix 2, the order of Ministry of Health |
| total hardness | ppm | 52.6 | 61.6 | 117% ↑ | 52.0 | 60.6 | 121% ↑ | and Social affairs, |
| C.O.D. | ppm | 4.1 | 3.7 | 10% ↓ | 4.0 | 3.5 | 13% ↓ | No. 102. |
| B.O.D. | ppm | 3.8 | 3.3 | 13% ↓ | 3.7 | 3.1 | 16% ↓ | |
| D.O. | ppm | 7.2 | 7.0 | 3% ↓ | 7.6 | 7.4 | 3% ↓ | |
| phenol | ppm | 0 | 0 | — | 0 | 0 | — | |
| Fe | ppm | 0.11 | 0.08 | 27% ↓ | 0.1 | 0.07 | 30% ↓ | |
| Ca | ppm | 12.6 | 14.8 | 123% ↑ | 12.5 | 14.4 | 115% ↑ | |
| Mn | ppm | 0 | 0 | — | 0 | 0 | — | |
| PCB | ppm | no detection | no detection | — | no detection | no detection | — | |
| ABS | ppm | 0 | 0 | — | 0 | 0 | — | |
| Cr | ppm | 0 | 0 | — | 0 | 0 | — | |
| As | ppm | 0 | 0 | — | 0 | 0 | — | |
| Zn | ppm | 0.12 | 0.11 | 8% ↓ | 0.10 | 0.08 | 20% ↓ | |
| CN | ppm | no detection | no detection | — | no detection | no detection | — | |
| Mg | ppm | 5.2 | 6.0 | 115% ↑ | 5.1 | 5.9 | 116% ↑ | |
| SiO$_2$ | ppm | 6.9 | 6.6 | 4% ↓ | 7.0 | 6.6 | 6% ↓ | |

TABLE 4

| | analysis of water quality (Bacteriological test) | | | | | | | |
|---|---|---|---|---|---|---|---|---|
| | 24 l/day filtration | | | | 48 l/day filtration | | | |
| | general bacteria | | bacteria coli group | | general bacteria | | bacteria coli group | |
| division | city water | filtered water | city water | filtered water | city water | filtered water | city water | filtered water | reference |
| first | 0 | 0 | 0 | 0 | 0 | 0 | 0 | 0 | 1. These were test values tested by an industrial pollution laboratory. |
| second | 0 | 0 | 0 | 0 | 0 | 4 | 0 | 0 | 2. Water samples were always taken when the water storage basin was full. 3. Test method was by appendix 2, the order of Ministry of Health and Social affairs, No. 102. |

TABLE 5

Bacteriological test carried out after taking the sample of the filtered water leaving at atmospheric temperature for 24 hours

| | 24 l/day filtration | | 48 l/day filtration | |
|---|---|---|---|---|
| | general bacteria filtered water | bacteria coli group filtered water | general bacteria filtered water | bacteria coli group filtered water |
| Division | | | | |
| auto-test | 0 (6 times) 5-11 (25 times) 13-35 (18 times) | 0 (10 times) | 0 (19 times) 2-16 (12 times) | 0 (5 times) |
| request first | 1 | 0 | 20 | 0 |
| test second | 3 | 0 | 0 | 0 |
| reference | 1. The value of auto-test was the test value which the applicant tested directly with auto-test machines and tools and Chemicals. The atmospheric temperature was room temperature, 15 C.-29 C. | | | |

As can be seen from the Tables, in one test Table 1 24 l/day was filtered, the filtration rate was 0.85M/day, the time spent on filtration (detention period in the filter basin 5) was 2.6 hours, the water storage basin 15 had a volume capable of storing the filtered product volume for 7 hours (detention period of the water storage basin 15), and it took 9.82 hours to reach the high water level of the water storage basin 15 from the intake valve 50.

In this example, according to Table 2 and Table 3, over 90% of the residual chlorine, 100% of the turbid material, about 10% of the organic material (B.O.D.), over 3% of nitrate nitrogen and over 6% of substances remaining after evaporation were removed, and, moreover, general bacteria levels were always within the permitted limit and bacteria of the coli group were non-existent.

It is to be noted that in filtered water which is filtered by the very slow filtration rate of 0.58M/day for 2.6 hours, a very small amount of residual chlorine always remains even when the water storage basin 15 is full, and the filter water reaches the high water level is before the time at which the regrowth of bacteria would begin to occur. That is, since during the time before bacterial growth normally occurs, the concentration of the residual chlorine is decreased gradually, the aftergrowth or multiplication of bacteria cannot occur.

As stated above, typically over 20 hours after chlorine disinfection must pass in the case of public supply water, before growth of bacteria occurs. However, in the case of the model of this test, 9.82 hours (Tab. 1 total detention period) were spent, so 10.18 hours are left for water to reach the intake valve 50 from the public water well.

As shown in Table 1, when 48 l/day is filtered by this same model, the total detention period is only 4.91 hours. In general, it can be stated that if over 24 l/day is filtered, the water can all be filtered safely. Therefore, the permitted minimum filtration volume per day of this model can be considered to be 24 l/day. To set this filtration rate, the intake valve 50 is simply controlled so that the position of the floating ball 62 of the float-type flowmeter 24 points to 24 l on the scale 66; an intake volume of 24 l/day is then taken substantially steadily and continuously.

The difference in water quality of the filtered water is less than 24 l/day is filtered or 48 l/day is filtered, with the same model in Tab. 2 and Tab. 3, Tab. 4 and Tab. 5. It will be understood that the volume range of water which may be repurified using equipment of the same volume is broad.

FIG. 8 shows the relation between the concentration of residual chlorine and filtering time. As shown in FIG. 8, the total detention period of Tab. 1 is 9.82 hours, and if the time to reach the intake valve 50 from the waterworks is 3 hours, the spare time left for safety is 7.18 hours, which is ample:—Also when the concentration of residual chlorine in the service pipe 61 is 0.4 ppm., the residual chlorine is maintained at almost the same concentration up to and in the settling zone 10, and although it is almost removed while passing through the filter gravel sand, even if there is a little difference in water temperature and quality from the water collecting zone 9 to the water storage basis 15, 0.015 ppm of the residual chlorine is maintained continuously.

Again, as shown in Table 5, when filtering 24 l/day in FIG. 8, it takes 3 hours to reach the intake valve 5 from the well, reservoir or public waterworks, and it takes 9.82 hours to reach the high water level of the water storage basin and within 24 hours from then, there is still hardly any multiplication of bacteria in the filtered water.

Some of the features described above can be summarized as follows:

The filtration method is a continuously and steady slow filtration using gravel and sand as filtering materials. Using this filtration method, residual chlorine is consumed and removed by oxidizing materials in the voids in the gravel and sand. The oxidized materials are also thereby reduced. Turbid materials are removed by being retained in the void of gravel and sand. The intake volume from the main supply is adjusted so that it is sufficient for filtration to be completed, and for filtered water to reach the top of the water storage basin, before bacterial regrowth occurs. The apparatus is disinfected when the main water supply or filtration is interrupted and any turbid materials retained in the apparatus can be discharged to the outside by back washing, as needed. Consequently, the residual chlorine, the turbid material, odor, organic material and oxidized materials in supply water are reduced or removed, bacteria levels are always within the permitted limit, and bacteria of the coli group are not present in general. Also the filtration effect is maintained without deterioration the filtering material and the filtering material need not be changed because it can be used semi-permanently.

What is claimed is:

1. A method for purifying water from a public supply which has been treated with chlorine to kill bacteria, said water containing oxidizing agents and solid impurities, comprising the steps of:

taking the water to be purified in a continuous flow from the public supply by selectively monitoring and adjusting intake;

leading the water through piping to a vertical tube into which the water flows so that the water in said tube has a free water surface subject to air pressure;

leading the water from the bottom of said vertical tube to a settling zone of a filter basin;

filtering the water in said filter basin by using water pressure from water in said vertical tube to slowly force the water from said settling zone upwards through a particulate filter material, wherein said chlorine and said solid impurities are removed from the water by said particulate material;

leading the filtered water from said filter basin up to a separate water storage basin located above said filter basin by an outflow pipe; and temporarily storing the filtered water in said water storage basin;

removing the filtered water from said water storage basin;

wherein all of the previous steps are automatically performed in a total retention time which is less than the time required for bacterial regrowth to begin.

2. A method as defined in claim 1, wherein said particulate material consists essentially of a layer of sand deposited upon a layer of gravel.

3. A method as defined in claim 1, further comprising the step of washing said filter basin by reversing the flow of water so that water flows downward through said filter basin.

4. A method as defined in claim 3, wherein said filter basin is washed when the difference between the water level in said vertical tube and in said storage basin reaches a given amount.

5. A method as defined in claim 1, wherein the flow is monitored by a float-type flowmeter.

6. A method as defined in claim 1, wherein the total time is less than 10 hours.

7. A method for purifying water from a public supply which has been treated with chlorine to kill bacteria, said water containing oxidizing agents and solid impurities, comprising the steps of:

taking the water to be purified continuously from the public supply;

leading the water through piping to a vertical tube into which the water flows so that the water in said tube has a free water surface subject to air pressure;

leading the water from the bottom of said vertical tube to a settling zone of a filter basin;

filtering the water in said filter basin by using water pressure from water in said vertical tube to slowly force the water from said settling zone upwards through a particulate filter material, wherein said chlorine and said solid impurities are removed from the water by said particulate material;

leading the filtered water from said filter basin to a water storage basin located above said filter basin;

temporarily storing the filtered water in said water storage basin;

all of the previous steps being performed in a total time which is less than the time required for bacterial regrowth to begin; and draining overflow water from the top of said water storage basin where there is more than a given amount of water in said water storage basin.

8. A method as defined in claim 7, wherein the volume of water taken from said public supply is such that the step of draining overflow water from said water storage basin is performed prior to the substantial regrowth of bacteria in the water in said water storage basin.

9. An apparatus for purifying water from a public supply which has been treated with chlorine to kill bacteria, said water containing oxidizing agents and solid impurities, comprising:

intake pipe means for intaking, and monitoring and adjusting intake, into said apparatus as a continuous flow of water from said supply;

a vertical tube into which the water from said intake pipe means flows and falls so that the water in said tube has a free water surface, said vertical tube having at least one ventilation hole so that said free water surface is subjected to air pressure;

a filter basin having a top and a bottom and having particulate material deposited therein for filtering water, said particulate material including voids;

inflow pipe means for leading the water from said vertical tube to the bottom of said filter basin;

a separate water storage basin located above said filter basin for storing filtered water;

outflow pipe means for leading water from the top of said filter basin up to said water storage basin;

a valved outflow means for releasing water in said water storage basin, said water in said water storage basin being suitable for human use; second outflow means for automatically removing water from said water storage basin to limit the retention time of the apparatus to less than the time required for bacterial regrowth to begin.

10. An apparatus as defined in claim 9, wherein said filter includes means for filtering water slowly through said voids in said particulate material so that chlorine in the water is oxidized by said oxidizing agents which are thereby reduced and said solid impurities are retained in said particulate material.

11. An apparatus as defined in claim 9, wherein said filter material consists essentially of a layer of sand deposited on a layer of gravel.

12. An apparatus as defined in claim 9, further comprising means for allowing water from said water storage basin to back-wash said filter basin, thereby cleaning said particulate material.

13. An apparatus as defined in claim 9, further comprising an inlet for disinfectant allowing said apparatus to be disinfected after an interruption of operation.

14. An apparatus as defined in claim 9, wherein said intake pipe means includes an adjustable valve for adjusting the flow of water from said supply and a flowmeter for indicating the flow of water from said supply.

15. An apparatus as defined in claim 14, wherein said flowmeter includes an upright transport tube containing a float for indicating the water level in said transport tube.

16. An apparatus as defined in claim 9, wherein said intake pipe means includes a distribution pipe which enters the top of said vertical tube so that water from said intake pipe means flows into said vertical tube, and down onto the surface of the water in said vertical tube, and wherein said vertical tube is transparent to allow observation of said inflow of water and the water level in said vertical tube.

17. An apparatus as defined in claim 9, wherein said filter basin further comprises a settling zone for receiving water to be filtered and a collection zone for collecting water after filtering.

18. An apparatus as defined in claim 17, wherein said filter basin further comprises a filter base having a plurality of holes for allowing the passage of water therethrough, said filter base separating said settling zone from said particulate filter material.

19. An apparatus as defined in claim 9, wherein said water storage basin is transparent on at least one side.

* * * * *